(12) United States Patent
Merritt

(10) Patent No.: US 8,162,145 B1
(45) Date of Patent: Apr. 24, 2012

(54) EMERGENCY SHELTER KIT

(76) Inventor: Timothy X. Merritt, Lewiston, ID (US)

( * ) Notice: Subject to any disclaimer, the term of this patent is extended or adjusted under 35 U.S.C. 154(b) by 0 days.

(21) Appl. No.: 12/907,073

(22) Filed: Oct. 19, 2010

(51) Int. Cl.
*B65D 69/00* (2006.01)
(52) U.S. Cl. .......................... 206/541; 135/95
(58) Field of Classification Search .................. 206/541, 206/223, 546, 547, 577, 225; 135/95, 117, 135/90, 115, 88.1
See application file for complete search history.

(56) References Cited

U.S. PATENT DOCUMENTS

| | | | | |
|---|---|---|---|---|
| 4,607,655 A | * | 8/1986 | Wagner et al. | 52/2.19 |
| 4,753,377 A | * | 6/1988 | Poluhowich | 224/163 |
| 4,784,172 A | * | 11/1988 | Yacoboni | 135/87 |
| 5,515,974 A | * | 5/1996 | Higson | 206/570 |
| 5,930,961 A | * | 8/1999 | Beaudet | 52/169.6 |
| 5,943,027 A | * | 8/1999 | Thill et al. | 343/895 |
| 6,981,593 B1 | * | 1/2006 | Klodt | 206/541 |
| 2007/0245676 A1 | | 10/2007 | Jaks et al. | |

* cited by examiner

*Primary Examiner* — Steven A. Reynolds
*Assistant Examiner* — King M Chu
(74) *Attorney, Agent, or Firm* — Michael L. Greenberg, Esq.; Greenberg & Lieberman, LLC

(57) ABSTRACT

A kit comprising the items needed to build an emergency shelter in the flexible-form rammed earth style, and a method of packing the items for shipment. The kit, designed for easy shipment to persons requiring emergency shelter, also includes the items needed to add a waterproof exterior layer to the outside of the shelter, along with items to construct a canvas awning, a water catchment system, lockable doors and lockable window shutters, and a composting toilet. The kit also includes mosquito netting to cover the doorway and windows of the shelter.

9 Claims, 3 Drawing Sheets

EMERGENCY SHELTER KIT

FIELD OF THE INVENTION

The present invention relates to an emergency shelter kit comprising the items needed to build a flexible-form rammed earth emergency shelter, and a packing process by which the items are packed into the kit for shipment. The items needed for the shelter's construction are packaged in the kit for easy shipment to persons requiring emergency shelter. The kit also includes the items needed to add a waterproof exterior layer to the outside of the shelter, along with items to construct a canvas awning, a water catchment system, lockable doors and lockable window shutters, and a composting toilet. The kit also includes mosquito netting to cover the doorway and windows. The kit materials are extremely adaptable to a wide range of terrain conditions and building styles, but the preferred embodiment of the kit contains the materials to construct a 12 foot diameter lancet dome with arched doorway and windows. These single, round rooms are modular and can be combined together to create larger dwellings.

BACKGROUND OF THE PRESENT INVENTION

Emergency shelter is an ever-present need in our crowded, disaster prone world. Whether from natural disasters like tsunamis or earthquakes or floods, or from man-made disasters such as riots or wars or economic collapse, persons displaced from their homes and in need of emergency shelter are always with us. For example, in early 2010, United Nations (UN) authorities spoke of a critical need for transitional shelters to bridge the gap between tents and the reconstruction of the infrastructure in Haiti. UN authorities want emergency shelters that will last between 3-5 years. Thus a real need exists for durable emergency shelters that can be constructed easily and at low cost.

One of the most intriguing recent ideas in shelter design was the "Superadobe" flexible-form rammed earth emergency shelter developed by the California Institute of Earth Art and Architecture, founded in 1986 by Iranian-American polymath Nader Khalili (1936-2008). This invention uses simple, easily available materials to construct durable and stable housing. Through an ingeniously simple method of construction that employs bags made of durable material (herein referred to as "earthbags"), earthen material and barbed wire, persons displaced by a disaster can construct durable shelter that can withstand hurricanes, earthquakes, and other natural disasters.

The present invention relates to an efficient means of providing the items needed to build a flexible-form rammed earth emergency shelter. The present invention is an emergency shelter kit of the items needed for the shelter's construction, packaged for easy shipment to persons requiring emergency shelter. The present invention also makes innovations to the shelter's construction by adding a canvas awning, a water catchment system, a composting toilet, mosquito netting for the doorway and windows, and a waterproof layer to the exterior of the shelter.

U.S. Pat. No. 5,934,027 issued to Khalili on Aug. 10, 1999 is for an earthquake-resistant building structure employing barbed wire and earthbags filled with earthen material. Khalili's invention is the structure itself, unlike the present invention that envisions a kit of items needed to build the structure. Khalili also lacks other innovations added by the present invention. One of these is a waterproof outer shell made by covering the exterior of the earthbags with roof coating material. Several other innovations of the present invention include a canvas awning, a water catchment system, a composting toilet, the hardware to build lockable doors and window shutters, and mosquito netting to cover the doorway and windows. All the items together in the kit, including all of the tools necessary to construct the shelter, represent a complete system that provides disaster victims with the means of acquiring shelter, water, basic sanitation, and a degree of physical security.

U.S. Patent application 2007/0245676 filed by Jaks et al. on Apr. 11, 2006 is for a kit containing all parts needed for assembling a housing unit. Jaks et al. differs from the present invention in that Jaks et al. is a kit containing the materials needed to assemble a conventional structure with walls, beams, roof, etc. The present invention, however, is a kit containing items to assemble a structure made primarily from earthen material, and that through its design is resistant to natural disasters such as hurricanes and earthquakes.

U.S. Pat. No. 4,784,172 issued to Yacoboni on Nov. 15, 1988 is for a kit containing all parts needed to construct an emergency shelter. Unlike the present invention, Yacoboni employs numerous trapezoidal panels that join together to form a structure. The present invention, however, is a kit containing items to assemble a structure made primarily from earthen material, and that through its design is resistant to natural disasters such as hurricanes and earthquakes.

U.S. Pat. No. 5,930,961 issued to Beaudet on Aug. 3, 1999 is for an emergency shelter to be assembled on site. Unlike the present invention, Beaudet employs base, wall and roof portions that are fitted together at the assembly site. The present invention, however, is a kit containing items to assemble a structure made primarily from earthen material, and that through its design is resistant to natural disasters such as hurricanes and earthquakes.

The present invention takes the concept of the flexible-form rammed earth emergency shelter and builds upon it, bringing it to a new level by incorporating design improvements and a method of packaging the necessary materials into an easily transportable kit that can be distributed to displaced persons.

SUMMARY OF THE PRESENT INVENTION

The idea behind the present invention is an emergency shelter kit contained in a barrel with the elements necessary to make a flexible-form rammed earth emergency shelter. The shelter is built in a dome shape, which requires no wood for roofing or even form work. The dome shape has been engineered to pass the California earthquake building standards and is considered to be the safest form of temporary shelter in a hurricane. All the components of the kit are to be utilized in the construction of the shelter, with some of the components serving dual uses (e.g., the barrel can be used as in a water catchment system). Thus, an earthquake and hurricane proof emergency shelter, along with the means of acquiring drinking water and improving sanitation, are included in one easy to ship, store and transport container.

The basic building blocks of the shelter are earthbags that are filled with earthen material and laid in rows, or courses, with a strand of barbed wire placed between each course. The earthbags are cut from a roll of polytube material, and are superior to conventional sandbags for three major reasons. First, they are better adapted to dome construction because their greater length adds to the tensile strength of each course. Second, they are quicker to fill than individual sandbags, which could prove to be very important when people struggle to erect shelters in the face of an oncoming disaster. Third, earthbags allow the insertion of an arched doorway and windows into a dome shaped building far more readily than do individual sandbags. As an arch widens, the earthbags for each layer of the arch can be cut to length and laid as a single piece, making the arch simpler and easier to construct.

The present invention incorporates several key innovations into the flexible-form rammed earth emergency shelter. One of these improvements is a waterproof outer shell, which is effected by the application of a commercial roof coating material to the exterior of the shelter. Another key improvement to the shelter relates to security. The present invention envisions a means of fashioning lockable doors and window shutters, an important feature for the safety of displaced persons, especially women and children. Other innovations that are part of the present invention include a canvas awning, a water catchment system, a composting toilet system, and mosquito netting to cover the doorway and windows.

All the items together in the kit represent a complete system that will provide disaster victims with shelter, water, basic sanitation and security. For example, a toilet seat lid that is included in the kit combines with a 5-gallon bucket to create a rudimentary composting toilet. This is an important feature because disaster victims routinely face sanitation problems that can lead to serious illness. In addition, the barrel that contains the kit can be converted to a key part of a rain water catchment system. This is important because disaster victims without a sufficient supply of fresh water risk dehydration and illness. Furthermore, the canvas awning that offers shade from the sun, and increases the living space available for cooking, cleaning and washing, is also the means by which rain water is directed to the empty barrel for the water catchment system. Finally, because malaria is a major killer in developing countries, the present invention includes mosquito netting to cover the doorway and windows, thus allowing users a measure of protection against this disease vector.

DETAILED DESCRIPTION OF THE PRESENT INVENTION

Figure 1:
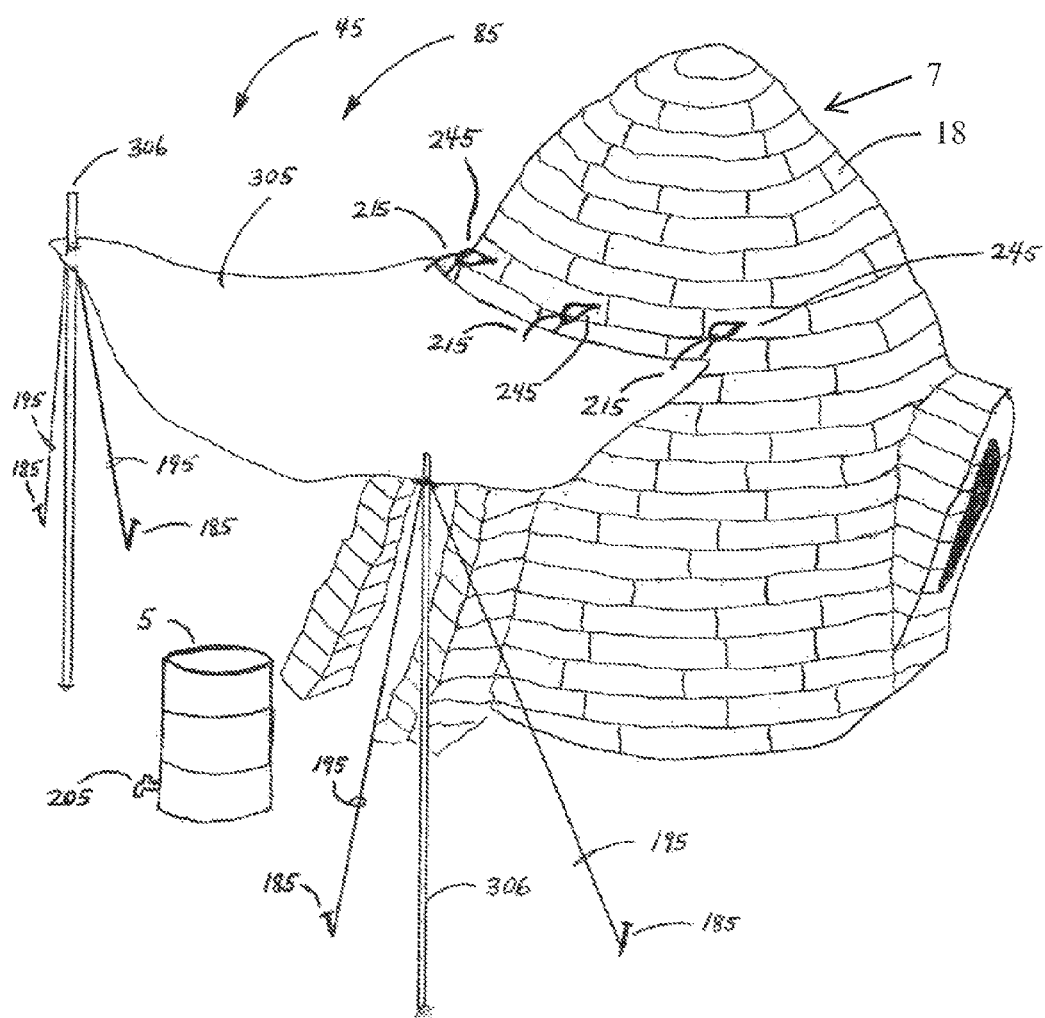
FIG. 1 shows the canvas awning (45) and water catchment system (85) of the present invention.
Figure 2:
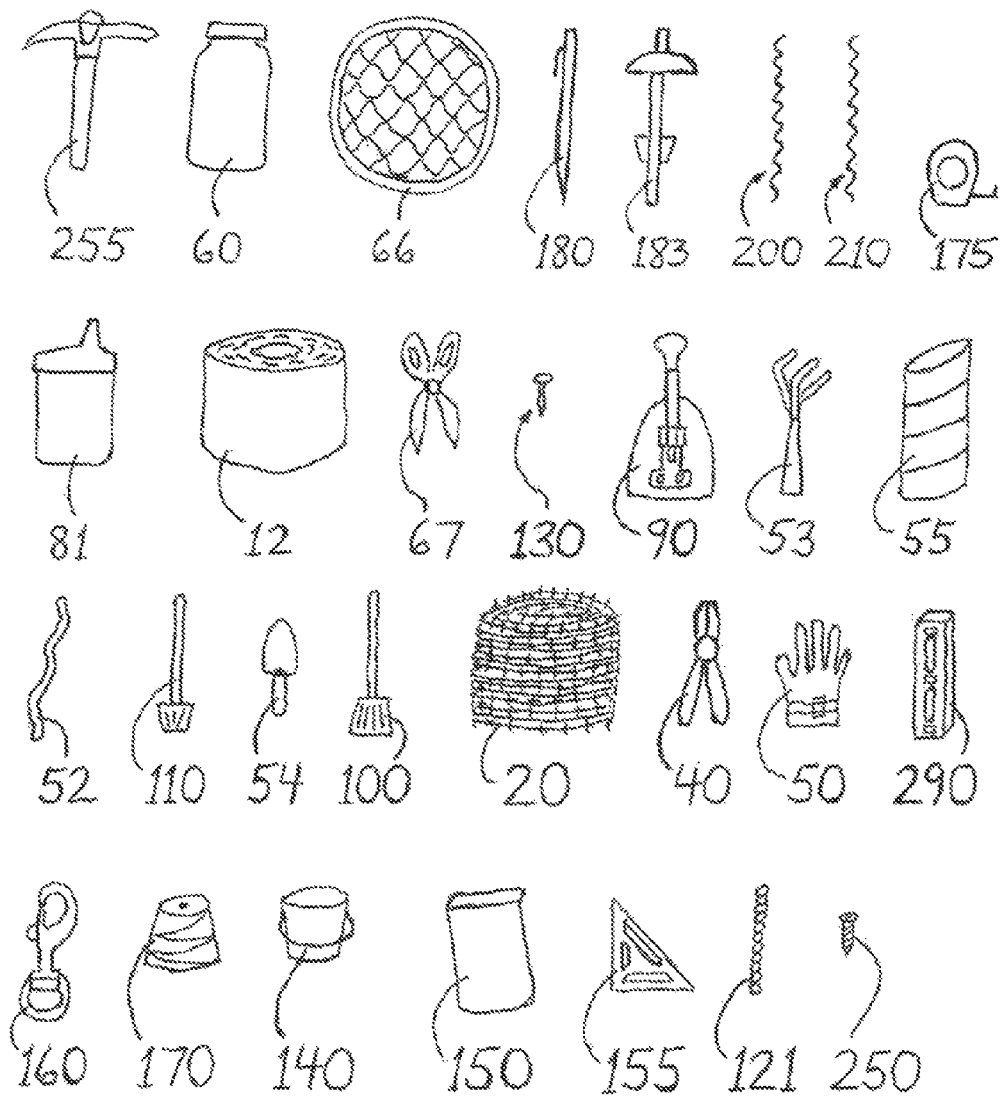
FIG. 2 shows various items that are part of the present invention.
Figure 3:
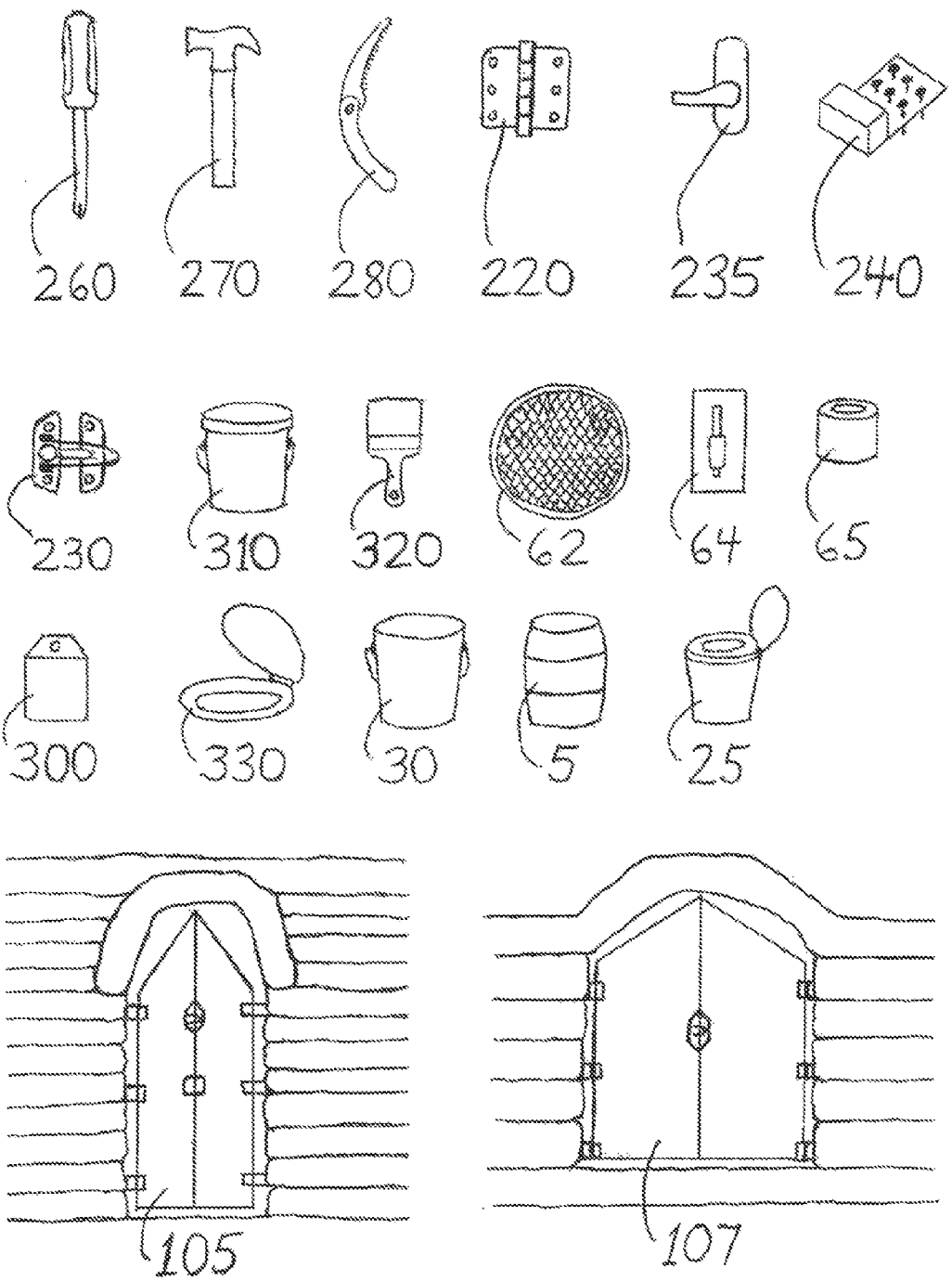
FIG. 3 shows more items that are part of the present invention.

The present invention comprises an emergency shelter kit (15) of components needed to construct a shelter (7) of the type known as flexible-form rammed earth, in the "Superadobe" style developed by the California Institute of Earth Art and Architecture. This style of shelter employs barbed wire (20) and earthbags (10) filled with earthen material to form rows, or courses (8), into the walls and roof of a durable shelter (7) for displaced persons. The preferred embodiment of the kit (15) envisions the shelter (7) as a lancet dome with a 12 foot diameter interior and arched openings for a doorway and windows. Because the shelter (7) is built in a dome shape, no wood is required for roofing or form work. The kit (15) is contained in a barrel (5), which in the preferred embodiment is a conventional 55-gallon drum preferably made of polyethylene. (It is essential the barrel (5) be made of non-toxic materials, since it will be used to hold drinking water in a water catchment system (85).)

Although the shelter (7) is fairly simple to build, there are a number of items necessary to construct it, and these items are included in the kit (15). These items are enumerated in the table found directly below, and explained in detail in the pages following. Although the items included in the kit (15), as well as the size and dimensions of the items, can vary in different embodiments of the present invention, the table below shows the preferred embodiment of the kit (15) with a brief description of the preferred embodiment of each item in the kit (15). After the table follows a description of how each item in the kit (15) is utilized to build the shelter (7), then a description of the packing process (70) of placing the items of the kit (15) into the barrel (5).

TABLE

| Name | Quantity | Preferred embodiment of items in kit (15) |
|---|---|---|
| Barrel (5) | 1 | 55-gallon drum of polyethelene |
| Hand pick (255) | 1 | Size: 12 inches long |
| Clear jar (60) | 1 | Clear plastic jar with height of 10 inches |
| First screen (66) | 1 | 22 inch diameter, ¾ inch expanded metal lathe |
| First stake (180) | 1 | Length: 18 inches, metal stake |
| Second stake (183) | 1 | Length: 18 inches; flanged bottom, turning ring on top |
| First chain (200) | 1 | "Height chain"; chain of 15 feet length |
| Second chain (210) | 1 | "Center chain"; chain of 15 feet length |
| Tape measure (175) | 1 | 30 feet long tape measure |
| Chalk bottle (81) | 1 | 8 ounce bottle |
| Polytube material (12) | 1 roll | Size: 16 inches by 900 feet |
| Scissors (67) | 1 | Heavy duty industrial shears |
| Nails (130) | 2 boxes | Size: 16p; quantity 2,000 |
| Shovels (90) | 4 | Collapsible (less than 1 foot long when collapsed) |
| Hand rake (53) | 1 | Size: 9 inches long |
| Tube chute (55) | 1 | Cardboard Sonotube TM; size: 8 inch x 24 inch |
| Elastic cord (52) | 1 | Bungee cord, 24 inches long |
| First tamper (110) | 1 | Size: 34 inches x 4 inches; weight: 8 lbs. |
| Hand shovel (54) | 1 | Size: 9 inches long |
| Second tamper (100) | 1 | Size: 34 inches x 6 inches; weight: 12 lbs. |
| Barbed wire (20) | 1 roll | 4-point galvanized; 880 feet length |
| Wire cutters (40) | 1 | Heavy duty; length: 10½ inches |
| Leather gloves (50) | 4 pair | Size: medium |
| Carpenter's level (290) | 1 | Length: 24 inches |
| Spring clips (160) | 12 | Size: 1/2 inch size |
| Poly Twine (170) | 1 roll | Length: 500 feet |
| Small buckets (140) | 4 | Size: 6.5 x 7 inches |
| Slider (150) | 1 | Metal, size: 12 inches wide x 14 inches long |
| Rafter square (155) | 1 | Size: 12 inches |
| Door arc chains (121) | 6 | Length: 3 feet, 8 inches |
| Wood screws (250) | 1 bag | A bag of 6 inch wood screws; at least 100 in quantity |
| Screwdriver (260) | 1 | Length: 9 inches; Phillips screw head |
| Hammer (270) | 1 | Length: 10 inches; framing hammer |
| Saw (280) | 1 | Length: 14 inches; folding hand saw |
| Hinges (220) | 14 | Size: 3½ inches |
| Latches (230) | 3 | Size: 4¼ inches |
| Strip anchors (240) | 16 | Size: 9 inches x 14 inches, composed of metal |
| Door handles (235) | 6 | Size: 5 inches |
| Roof coating (310) | 4.75 Gal | Container of elastomeric or asphalt-based coating |
| Paint brushes (320) | 2 | Standard four inch size |
| Second screen (62) | 1 | 22 inches diameter, ¼ inch expanded metal lathe |
| Trowel (64) | 1 | Size: 11 inches long |
| Paint (65) | 3 cans | Size: 1 pint cans |
| Mosquito netting (300) | 1 bag | Fine mesh polyester material; size: 48 inches x 78 inches |
| Tarpaulin (305) | 1 | Rectangular shape; size: 8 feet x 10 feet |
| Extendable poles (306) | 2 | Length: 26 inches, extend to 8 feet length |
| Snap links (215) | 5 | Size: 2.5 inches |
| Eye hooks (245) | 3 | Size/Type: 10 inch galvanized steel |
| Tent pegs (185) | 4 | Length: 9 inches |
| Tent strings (195) | 1 roll | Size: 100 feet in length |
| Faucet (205) | 1 | 2 inch size |
| Toilet seat lid (330) | 1 | Conventional standard size |
| Bucket (30) | 1 | 5 gallon size |

The first step after unpacking the contents of the barrel (5) and prior to starting construction is to perform a soil analysis. A hand pick (255), provided to dig hard, rocky soil, is a handheld pick of 12 inches length in the preferred embodiment of the present invention. The user employs the hand pick (255) to get earthen material for the soil analysis. The user then fills a clear jar (60) with a few cups of earthen material, adds water until the clear jar (60) is ¾ full, then shakes the clear jar (60) vigorously. After 24 hours the earthen material will settle, allowing the user to discern the amount of silt, clay and sand for that type of earthen material. Knowing the condition of the local earthen material will allow the user to make adjustments to the soil type when building the shelter (7). The shelter (7) built by the kit (15) generally works best with earthen material that is approximately 80% sand and 20% clay.

A first screen (66) is included in the kit (15) to sift the earthen material for larger rocks and gravel which are needed for the foundation on which the shelter (7) will be built. The first screen (66), in the preferred embodiment of the present invention, is circular in shape for ease of shipping in the barrel, with a diameter of 22 inches, a mesh of ¾ inch expanded metal lathe, and a conventional rubber hand grip around the rim.

For preparing the foundation of the shelter (7), the items included in the kit (15) are a first stake (180), a second stake (183), a first chain (200), a second chain (210), a tape measure (175), and a chalk bottle (81). In the preferred embodiment, the first stake (180) is an 18 inch long metal stake used in conjunction with the first chain (200), which is a "height chain" that needs to be at least 15 feet long to build the shelter (7) with a 12 feet diameter (the formula for the length of the first chain (200) is the diameter of the shelter (7) multiplied by 1.25). The first stake (180) and first chain (200) are placed slightly outside the area where the doorway of the shelter (7) will be located, and the arc of the first chain (200) describes the arc of the beehive-shaped shelter (7). The second stake (183) in the preferred embodiment is 18 inches long, with flanges on the bottom to hold it securely in the ground and a turning ring on top, and is placed in the center of the foundation of the shelter (7). The second chain (210), which is a "center chain" that needs to be at least 15 feet long and markable at various lengths, attaches to the second stake (183) and will be used to measure off the size of the inner radius of the dome of the shelter (7), as well as to construct higher courses (8) of earthbags (10). The tape measure (175) in the preferred embodiment is a conventional metal tape measure of 30 feet length that will be used throughout the construction process. The chalk bottle (81), in the preferred embodiment of the present invention, is a conventional 8 ounce bottle of marking chalk used to lay down lines where the courses (8) of the shelter (7) will be built.

After the foundation of the shelter (7) has been prepared, a roll of polytube material (12), which is envisioned in the preferred embodiment as a roll 16 inches wide by 900 feet long, is cut with a pair of scissors (67) to form earthbags (10) to fill with earthen material. One end of the earthbag (10) can be sealed by twisting or folding and tucking the loose material underneath the earthbag (10) to hold it closed, or it can also be folded and pinned closed with a nail (130). In the preferred embodiment of the present invention, two boxes of nails (130) of the 16p galvanized type, and in a quantity of 2,000, are included in the kit (15). (The nails (130) will also be used in constructing lockable doors (105) and lockable window shutters (107), described below.) In order to fill the earthbags (10), shovels (90), a hand rake (53), a tube chute (55), an elastic cord (24), a first tamper (110) and a hand shovel (54) are used as described below.

In filling the earthbags (10), the shovels (90) are used for digging the earthen material that will fill the earthbags (10). The preferred embodiment of the present invention envisions four shovels (90) that are collapsible, with a length of approximately one foot when collapsed and three feet when expanded. The hand rake (53), a conventional three-pronged rake of 9-inch length in the preferred embodiment, is used to break the earthen material into smaller particles before placing it into the earthbags (10). The tube chute (55) is envisioned in the preferred embodiment as a cardboard Sonotube™ of 8 inch by 24 inch size, although a comparable cardboard tube could also be employed. The tube chute (55) is used to hold an earthbag (10) open while earthen material is poured through the tube chute (55) into the earthbag (10). In order to hold the earthbag (10) onto the tube chute (55) while the earthbag (10) is being filled with earthen material, the elastic cord (52), a bungee cord of 24 inch length in the preferred embodiment, is placed around both the earthbag (10) and the tube chute (55). Once the earthbag (10) is filled, the first tamper (110) is used to tamp down the earthen material placed into the earthbag (10). The first tamper (110) is a concrete weight attached to a short wooden handle, envisioned in the preferred embodiment with a size of 34 inches by 4 inches and a weight of eight pounds. The hand shovel (54), a conventional 9 inch long shovel in the preferred embodiment of the present invention, is used to trim away excess earthen material inside the earthbags (10) after the tamping process. Once the contents of the earthbag (10) are tamped, the open end of the earthbag (10) can be folded and pinned closed with a nail (130). Although the length of each earthbag (10) will vary according to placement, each earthbag (10) will have a thickness of approximately five inches after filling.

A second tamper (100) is envisioned in the preferred embodiment as a concrete weight attached to a short wooden handle with a size of 34 inches by 6 inches and a weight of 12 pounds. After the earthbag (10) is filled with earthen material and pinned closed with a nail (130), the second tamper (100), is used to tamp the earthbag (10). The filled earthbags (10) must be tamped until they are hard and stable, since loosely filled earthbags (10) can cause the shelter (7) to fall. (In other embodiments of the present invention, the functions of both the first tamper (110) and second tamper (100) could be fulfilled by other implements such as a brick or plumber's tamper, but whatever implement is used, it's important the earthbags (10) don't tear during the tamping process.) The filled and tamped earthbags (10) will then be formed into a measured circle using the second chain (210). Then the user will use the second chain (210) in conjunction with the first chain (200) to determine the inner diameter of each course (8) of filled earthbags (10), until all the courses (8) are laid.

A key part of the courses (8) of filled earthbags (10) laid to form the shelter (7) is barbed wire (20). The barbed wire (20) envisioned in the preferred embodiment is 4-point galvanized in a length of 880 feet. In order to build the shelter (7), a single strand of barbed wire (20) is laid on top of each course (8) of filled earthbags (10) to keep the courses (8) of filled earthbags (10) fastened together. The wire cutters (40), envisioned in the preferred embodiment as having an overall length of 10½ inches, are used to cut the barbed wire (20) that will be placed between the courses (8) of filled earthbags (10). The preferred embodiment envisions four pairs of leather gloves (50) of medium size, which are necessary for the users handling the barbed wire (20) when constructing the shelter (7). As each successive course (8) of earthbags (10) is laid down, it is tamped into place by the second tamper (100). The tamping process must ensure that each course (8) of filled earthbags (10) is flat in order for the shelter (7) to be solid. The carpenter's level (290), of conventional type and 24 inch length in the preferred embodiment, is used to check the level of the courses (8) of filled earthbags (10) and ensure they are straight and flat.

In constructing the courses (8) of filled earthbags (7), two other essential items that are included in the kit (15) are spring clips (160) and poly twine (170). The spring clips (160), of ½ inch size and 12 in number in the preferred embodiment, are used in conjunction with the poly twine (170) when laying the courses (8) of barbed wire (20) and filled earthbags (10). The poly twine (170) in the preferred embodiment is envisioned as a roll 500 feet in length. The poly twine (170) and spring clips (160) are used as follows: the user wraps 50 feet of poly twine (170) around a brick or rock, securing one end of the poly twine (170) under the first course (8) of earthbags. Then the poly twine (170), weighted down by the brick or rock, is laid over the strand of barbed wire (20) on each successive course (8), with the brick or rock hanging off the side of the course (8) and held there by a spring clip (160) attached to the poly twine (170). The purpose of this procedure is to keep the barbed wire (20) in place on top of the course (8) before it is covered by the next course (8). This technique also interweaves the twine (170) in and out of the courses (8) of earthbags (10), adding a little extra support during the laying of courses (8). It's a simple process that prevents the need of placing bricks every few feet on top of the springy barbed wire (20) to keep it from falling off the earthbags (10).

In constructing the higher courses (8) of filled earthbags (10), additional items are needed, namely small buckets (140) and a slider (150). The small buckets (140) in the preferred embodiment are in a quantity of four, with each bucket (140) made of sturdy plastic and measuring 6.5 inches by 7 inches (although any metal or sturdy plastic container of comparable size would suffice). The small buckets (140) are needed because a full earthbag (10) that has been properly tamped can weigh more than 100 pounds, and the highest courses (8) of the shelter (7) are more than ten feet in the air. Without the small buckets (140), a filled earthbag (10) must be filled at ground level and then carried up the steep courses (8) of the shelter (7) in order to be placed. Instead, a three person crew works like this: a first user is on top of the courses (8), say ten feet in the air, with a second user at the ground level filling a small bucket (140) with earthen material. The second user then tosses the filled small bucket (140) to a third user, who is also standing on top of the courses (8). The third user catches the small bucket (140), empties it into the open earthbag (10), and then drops the empty small bucket (140) back down to the second user. This has been proven to be the most effective way to fill the heavy earthbags (10) that are placed on top of the higher courses (8) of the shelter (7). The slider (150) is a flat piece of metal, envisioned in the preferred embodiment as 12 inches wide and 14 inches long, with a flared end designed for a user to grab. The slider (150) is needed when a user is filling an earthbag (10) while standing on top of the courses (8) of the shelter (7). When the earthbag (10) is in a vertical position while being filled on top of the courses (8), that means the earthbag (10) is sitting on a strand of barbed wire (20), since a single strand of barbed wire (20) is placed on top of each course (8). Without the slider (150), when the user goes to lay the filled earthbag (10) on top of the course (8), the earthbag (10) will catch on the barbed wire (20) and tear. By sitting the earthbag (10) on the slider (150) while filling it, the user avoids tearing the earthbag (10) on the barbed wire (20).

When the earthbag (10) is filled, the user pulls the slider (150) out from under the filled earthbag (10) so that the filled earthbag (10) is placed into position on top of the strand of barbed wire (20).

Building the three arches in the shelter (7) for the doorway and windows requires the use of a rafter square (155) and door arc chains (121). The rafter square (155), of 12 inch size in the preferred embodiment, is used for laying out the straight edges of the doorway and windows. Each door arc chain (121) is a lightweight chain that attaches to the springline of each arch (the point of an arch where the curvature starts is called the springline) in order to "describe" the inside curves of the arches so that they can be built correctly. The preferred embodiment of the present invention envisions six door arc chains (121), each one 44 inches long, for inclusion in the kit (15), one door arc chain (121) for each half of the three arches.

The present invention also includes materials to build into the shelter (7) lockable doors (105) and lockable window shutters (107). The lockable doors (105) are envisioned in the preferred embodiment of the present invention as two French style doors that form a single door split lengthwise up the middle. The lockable window shutters (107) are envisioned in the preferred embodiment as two shutters for each of the two windows of the shelter (7), with one shutter placed on each side of each window. Some of the materials included in the kit (15) to build the lockable doors (105) and lockable window shutters (107) include wood screws (250), a screwdriver (260), a hammer (270), and a saw (280). In the preferred embodiment of the present invention, the wood screws (250) are six inches long and in a quantity of at least 100, the screwdriver (260) is of nine inch length with a Phillips screw head, the hammer (270) is a framing hammer of ten inch length, and the saw (280) is a folding saw with a 14 inch tempered steel alloy folding blade.

Other materials included in the kit (15) to build the lockable doors (105) and lockable window shutters (107) include hinges (220), latches (230), strip anchors (240), and door handles (235). The preferred embodiment envisions fourteen hinges (220) of 3½ inch size, with six hinges (220) for the lockable doors (105) (three hinges (220) for the left side and three hinges (220) for the right side of the French style door split lengthwise up the middle) and eight hinges (220) for the four lockable window shutters (107) (two shutters for each window, two hinges (220) for each shutter). The latches (230), envisioned in the preferred embodiment as three of 4¼ inch size, will also be used, with one latch (230) installed to lock the pair of lockable doors (105), and two latches (230) installed to lock both pairs of lockable window shutters (107). Strip anchors (240), envisioned in the preferred embodiment as 9 inch by 14 inch metal pieces in a quantity of 16, are utilized so that the lockable doors (105) and lockable window shutters (107) can be fastened to the courses (8) of filled earthbags (10). The flat portion of the strip anchor (240), with nails protruding upwards and downwards, is inserted between courses (8) of earthbags (10) to provide a firmly secured "strip" into which the hinges (220) can be fastened. The door handles (235), six in number and of five inch size in the preferred embodiment, attach to the lockable doors (105) and lockable window shutters (107). (Although the wood to build the lockable doors (105) and lockable window shutters (107) is not included in the kit (15), the pallets on which the barrels (5) are shipped, or any other salvaged wood, can be used.)

After the shelter (7) has been constructed from the kit (15), the shelter (7) will be given an external waterproof coating (18) and a coat of paint (19). First, roof coating (310) is applied to the shelter (7) with paint brushes (320), with the roof coating (310) envisioned in the preferred embodiment as a 4.75 gallon container of elastomeric coating (although an asphalt based coating may also be used), and the paint brushes (320) envisioned as two in number and of 4-inch size. After the roof coating (310) is applied to the shelter (7), in order to complete the external waterproof coating (18), a plaster made of fine clay particles is applied. To make the plaster, the kit (15) includes a second screen (62) and trowel (64), the second screen (62) envisioned in the preferred embodiment as circular, 22 inches in diameter, and made of ¼ inch expanded metal lathe, and the trowel (64) as 11 inches in length. The second screen (62) is utilized to sift soil into fine clay particles to make plaster that can be applied by the trowel (64) to both the interior and exterior of the shelter (7), followed by a second coat of roof coating (310) on the exterior of the shelter (7). This process will provide an external waterproof coating (18) for the shelter (7). Paint (65) can then be applied for decorative purposes by utilizing the three pint sized cans included in the preferred embodiment of the kit (15).

In addition, mosquito netting (300) is included in the kit (15) to overlay the doorway and windows to protect inhabitants from mosquitoes that may be carrying malaria. The preferred embodiment of the kit (15) envisions a bag of mosquito netting (300), with the mosquito netting (300) made of fine mesh polyester 48 inches by 72 inches in size.

Two other features of the present invention are the canvas awning (45) and water catchment system (85). In the preferred embodiment of the present invention, as shown in FIG. 1, the canvas awning (45) and water catchment system (85) are made with items that include a tarpaulin (305), extendable poles (306), snap links (215), eye hooks (245), tent pegs (185) tent strings (195), and a faucet (205). The canvas awning (45) provides shade outside the shelter (7), giving inhabitants a place to perform washing and other tasks, and creating a community space in which they can socialize. The canvas awning (45) is also a key part of the water catchment system (85), catching rain water that is diverted to the empty barrel (5) in the water catchment system (85). In the preferred embodiment, the tarpaulin (305) is in a rectangular size of 8 feet by 10 feet, and connected to the shelter (7) by means of three snap links (215), 2.5 inches in size, and three eye hooks (245) of 10 inch galvanized steel. Each eye hook (245) attaches to the exterior of the shelter (7) by means of a strip anchor (240) (not shown in FIG. 1). The tarpaulin (305) is also held up at two corners by the extendable poles (306), which in the preferred embodiment are two in number, with a collapsed length of 26 inches and an extended length of eight feet, and secured by tent strings (195) to tent pegs (185) placed in the ground. The tent pegs (185) are envisioned in the preferred embodiment as nine inches long, and the tent strings (195) in a roll of 100 feet length that can be cut to size. The barrel (5) is used to catch water that gathers into the tarpaulin (305) during periods of rainfall, and the faucet (205) is attached near the base of the barrel (5) in order to withdraw water.

Another feature of the present invention is a composting toilet (25). The composting toilet (25) is a simple item, but essential for proper sanitation at the site of the shelter (7).

The composting toilet (25) is made of a toilet seat lid (330) and a bucket (30). In the preferred embodiment, the toilet seat lid (330) is a conventional commercial toilet seat, and the bucket (30) is a conventional, 5-gallon size, plastic bucket.

The packing process (70) by which the items of the kit (15) are placed into the barrel (5) is also a key aspect of the present invention. The estimated weight of the barrel (5) after the packing process (70) is 240 pounds. By following the steps of the packing process (70) enumerated below, the items of the kit (15) will be packed tightly into the barrel (5), so that the barrel (5) can be tipped on its side and rolled by hand to a work site. This aspect of the invention is important for disaster areas where there are no forklifts or infrastructure.

The steps of the packing process (70) by which the items of the kit (15) are placed into the barrel (5) are enumerated below. The first steps of the packing process (70) are ensuring the barrel (5) is empty (1000), placing the first screen (66) and second screen (62) into the barrel (5) flat on the base of the barrel (5) (1010), wrapping the polytube material (12) around the barbed wire (20) (1020), and placing the polytube material (12) wrapped around the barbed wire (20) into the barrel (5) (1030). The next step in the packing process (70) is placing the extendable poles (306), the first tamper (110), and the second tamper (100) into the barrel (5), disposed between the polytube material (12) and the barrel (5) (1040). The next steps are pressing flat the tube chute (55) (1050), placing into the barrel (5) the flattened tube chute (55) disposed between the polytube material (12) and the barrel (5) (1060), then placing the rafter square (155) and carpenter's level (290) into the barrel (5) within the center of the flattened tube chute (55) (1070). The first stake (180), first chain (200), and strip anchors (240) are next placed into the barrel (5) disposed between the polytube material (12) and the barrel (5) (1080), then the second stake (183), second chain (210), chalk bottle (81), and tent pegs (185) are placed into the barrel (5) disposed between the polytube material (12) and the barrel (5) (1090).

The next step in the packing process (70) is placing the roof coating (310) inside the bucket (30) (1110), and placing the roof coating (310) and bucket (30) into the barrel (5) on top of the polytube material (1120). The next step in the packing process (70) is placing the saw (280), paint brushes (320), hand shovel (54), hand pick (255), trowel (64), hammer (270), screwdriver (260), hand rake (53), scissors (67), and wire cutters (40) into the barrel (5) disposed between the bucket (30) and the barrel (5) (1130). The clear jar (60) and the paint (65) are also placed into the barrel (5) disposed between the bucket (30) and the barrel (5) (1140).

The next step of the packing process is ensuring the small buckets (140) are empty (1150). Then the latches (230), the door handles (235), the hinges (220), and one pair of leather gloves (50) are placed in one of the small buckets (140) (1160); the nails (130), the poly twine (170), the tent strings (195), the faucet (205), and one pair of leather gloves (50) are placed in one of the small buckets (140) (1170); the spring clips (160), the snap links (215), the tape measure (175), and one pair of leather gloves (50) are placed in one of the small buckets (140) (1180); and the elastic cord (52), the eye hooks (245), the wood screws (250), the door arc chains (121), and one pair of leather gloves (50) are placed in one of the small buckets (140) (1190). The small buckets (140) are then placed into the barrel (5) disposed between the bucket (30) and the barrel (5) (1200).

The next steps are placing the shovels (90) into the barrel (5) on top of the bucket (30) (1210), placing the mosquito netting (300) into the barrel (5) on top of the shovels (90) (1220), placing the toilet seat lid (330) into the barrel (5) on top of the mosquito netting (300) (1230), placing the tarpaulin (305) into the barrel (5) on top of the toilet seat lid (330) (1240), and placing the slider (150) into the barrel (5) on top of the tarpaulin (305) (1250). At this point, all the items in the kit (15) are packed in the barrel (5), and the barrel (5) is to be sealed for shipment (1260).

In summary, the present invention is a kit (15) for building a shelter (7) of the flexible form, rammed earth type, comprising the barrel (5), the hand pick (255), the clear jar (60), the first screen (66), the first stake (180) and the second stake (183), the first chain (200) and the second chain (210), the tape measure (175), the chalk bottle (81), the polytube material (12), the scissors (67), the nails (130), the shovels (90), the hand rake (53), the tube chute (55), the elastic cord (52), the first tamper (110), the hand shovel (54), the second tamper (100), the barbed wire (20), the wire cutters (40), the leather gloves (50), the carpenter's level (290), the spring clips (160), the poly twine (170), the small buckets (140), the slider (150), the rafter square (155), the door arc chains (121), the wood screws (250), the screwdriver (260), the hammer (270), the saw (280), the hinges (220), the latches (230), the strip anchors (240), the door handles (235), the roof coating (310), the paint brushes (320), the second screen (62), the trowel (64), the paint (65), the mosquito netting (300), the tarpaulin (305), the extendable poles (306), the snap links (215), the eye hooks (245), the tent pegs (185), the tent strings (195), the faucet (205), the toilet seat lid (330) and the bucket (30), wherein the hand pick (255), the clear jar (60), the first screen (66), the first stake (180) and the second stake (183), the first chain (200) and the second chain (210), the tape measure (175), the chalk bottle (81), the polytube material (12), the scissors (67), the nails (130), the shovels (90), the hand rake (53), the tube chute (55), the elastic cord (52), the first tamper (110), the hand shovel (54), the second tamper (100), the barbed wire (20), the wire cutters (40), the leather gloves (50), the carpenter's level (290), the spring clips (160), the poly twine (170), the small buckets (140), the slider (150), the rafter square (155), the door arc chains (121), the wood screws (250), the screwdriver (260), the hammer (270), the saw (280), the hinges (220), the latches (230), the strip anchors (240), the door handles (235), the roof coating (310), the paint brushes (320), the second screen (62), the trowel (64), the paint (65), the mosquito netting (300), the tarpaulin (305), the extendable poles (306), the snap links (215), the eye hooks (245), the tent pegs (185), the tent strings (195), the faucet (205), the toilet seat lid (330), and the bucket (30) are configured to fit together inside the barrel (5).

In addition, present invention further comprises a canvas awning (45), water catchment system (85), and external waterproof coating (18) for the shelter (7). The canvas awning (45) for the shelter (7) is comprised of the tarpaulin (305), the extendable poles (306), the snap links (215), the eye hooks (245), the tent pegs (185), and the tent strings (195). The water catchment system (85) for the shelter (7) is comprised of the tarpaulin (305), the extendable poles (306), the snap links (215), the eye hooks (245), the tent pegs (185), the tent strings (195), the barrel (5), and the faucet (205). The external waterproof coating (18) for the shelter (7) is comprised of the roof coating (310), the paint brushes (320), the second screen (62), and the trowel (64).

Furthermore, the present invention also comprises a composting toilet (25), lockable doors (105), and lockable window shutters (107) for the shelter (7). The composting toilet (25) for the shelter (7) is comprised of the toilet seat lid (330) and the bucket (30). The lockable doors (105) for the shelter (7) are comprised of the hinges (220), the latches (230), the strip anchors (240), the door handles (235), the wood screws (250), the nails (130), the hammer (270), the saw (280), and the screwdriver (260). The lockable window shutters (107) for the shelter (7) are comprised of the hinges (220), the latches (230), the strip anchors (240), the door handles (235), the wood screws (250), the nails (130), the hammer (270), the saw (280), and the screwdriver (260). In addition, the present invention comprises mosquito netting (300), wherein the lockable doors (105) of the shelter (7) are covered with the mosquito netting (300), and the lockable window shutters (107) of the shelter (7) are covered with the mosquito netting (300).

Finally, the present invention includes the packing process (70) of assembling the emergency shelter kit (15), the packing process (70) comprising the following steps: ensuring the barrel (5) is empty (1000); placing the first screen (66) and the second screen (62) into the barrel (5) flat on the base of the barrel (5) (1010); wrapping the polytube material (12) around the barbed wire (20) (1020); placing the polytube material (12) wrapped around the barbed wire (20) into the barrel (5) (1030); placing extendable poles (306), the first tamper (110), and the second tamper (100) into the barrel (5), disposed between the polytube material (12) and the barrel (5) (1040); pressing flat a tube chute (55) (1050); placing into the barrel (55) the flattened tube chute (55) disposed between the polytube material (12) and the barrel (5) (1060); placing the rafter square (155) and the carpenter's level (290) into the barrel (5) within the center of the flattened tube chute (55) (1070); placing into the barrel (5) disposed between the polytube material (12) and the barrel (5) the first stake (180), the first chain (200), and the strip anchors (240) (1080); placing into the barrel (5) disposed between the polytube material (12) and the barrel (5) the second stake (183), the second chain (210), the chalk bottle (81), and the tent pegs (185) (1090); placing the roof coating (310) inside the bucket (30) (1110); placing the roof coating (310) and the bucket (30) into the barrel (5) on top of the polytube material (12) (1120); placing the saw (280), the paint brushes (320), the hand shovel (54), the hand pick (255), the trowel (64), the hammer (270), the screwdriver (260), the hand rake (53), the scissors (67), and the wire cutters (40) into the barrel (5) disposed between the bucket (30) and the barrel (5) (1130); placing the clear jar (60) and the paint (65) into the barrel (5) disposed between the bucket (30) and the barrel (5) (1140); ensuring the small buckets (140) are empty (1150); placing the latches (230), the door handles (235), the hinges (220), and one pair of leather gloves (50) into one of the small buckets (140) (1160); placing the nails (130), the poly twine (170), the tent strings (195), the faucet (205), and one pair of leather gloves (50) into one of the small buckets (140) (1170); placing the spring clips (160), the snap links (215), the tape measure (175), and one pair of leather gloves (50) into one of the small buckets (140) (1180); placing the elastic cord (52), the eye hooks (245), the wood screws (250), the door arc chains (121), and one pair of leather gloves (50) into one of the small buckets (140) (1190); placing the small buckets (140) into the barrel (5) disposed between the bucket (30) and the barrel (5) (1200); placing the shovels (90) into the barrel (5) on top of the bucket (30) (1210); placing the mosquito netting (300) into the barrel (5) on top of the shovels (90) (1220); placing the toilet seat lid (330) into the barrel (5) on top of the mosquito netting (300) (1230); placing the tarpaulin (305) into the barrel (5) on top of the toilet seat lid (330) (1240); placing the slider (150) into the barrel (5) on top of the tarpaulin (305) (1250); and sealing the barrel (5) (1260).

The elements of the kit (15) enumerated above may change as needs dictate. Elements may be added or removed from the contents of the kit (15) according to the particular conditions of a disaster area. However, the basic elements of the kit (15) will remain substantially the same.

I claim:
1. A kit for building a shelter of the flexible form, rammed earth type, comprising:
 a barrel;
 a hand pick;
 a clear jar;
 a first screen;
 a first stake and a second stake;
 a first chain and a second chain;

a tape measure;
a chalk bottle;
polytube material;
scissors;
nails;
shovels;
a hand rake;
a tube chute;
an elastic cord;
a first tamper;
a hand shovel;
a second tamper;
barbed wire;
wire cutters;
leather gloves;
a carpenter's level;
spring clips;
poly twine;
small buckets;
a slider;
a rafter square;
door arc chains;
wood screws;
a screwdriver;
a hammer;
a saw;
hinges;
latches;
strip anchors;
door handles;
roof coating;
paint brushes;
a second screen;
a trowel;
paint;
mosquito netting;
a tarpaulin;
extendable poles;
snap links;
eye hooks;
tent pegs;
tent strings;
a faucet;
a toilet seat lid; and
a bucket;

wherein the hand pick, the clear jar, the first screen, the first stake and the second stake, the first chain and the second chain, the tape measure, the chalk bottle, the polytube material, the scissors, the nails, the shovels, the hand rake, the tube chute, the elastic cord, the first tamper, the hand shovel, the second tamper, the barbed wire, the wire cutters, the leather gloves, the carpenter's level, the spring clips, the poly twine, the small buckets, the slider, the rafter square, the door arc chains, the wood screws, the screwdriver, the hammer, the saw, the hinges, the latches, the strip anchors, the door handles, the roof coating, the paint brushes, the second screen, the trowel, the paint, the mosquito netting, the tarpaulin, the extendable poles, the snap links, the eye hooks, the tent pegs, the tent strings, the faucet, the toilet seat lid, and the bucket are configured to fit together inside the barrel.

2. The kit of claim 1, further comprising a canvas awning for said shelter, the canvas awning comprised of said tarpaulin, said extendable poles, said snap links, said eye hooks, said tent pegs, and said tent strings.

3. The kit of claim 1, further comprising a water catchment system for said shelter, the water catchment system comprised of said tarpaulin, said extendable poles, said snap links, said eye hooks, said tent pegs, said tent strings, said barrel, and said faucet.

4. The kit of claim 1, further comprising an external waterproof coating for said shelter, the external waterproof coating comprised of said roof coating, said paint brushes, said second screen, and said trowel.

5. The kit of claim 1, further comprising a composting toilet for said shelter, the composting toilet comprised of said toilet seat lid and said bucket.

6. The kit of claim 1, further comprising lockable doors for said shelter, the lockable doors comprised of said hinges, said latches, said strip anchors, said door handles, said wood screws, said nails, said hammer, said saw, and said screwdriver.

7. The kit of claim 1, further comprising lockable window shutters for said shelter, the lockable window shutters comprised of said hinges, said latches, said strip anchors, said door handles, said wood screws, said nails, said hammer, said saw, and said screwdriver.

8. The kit of claim 6, wherein said lockable doors of said shelter are covered with said mosquito netting.

9. The kit of claim 7, wherein said lockable window shutters of said shelter are covered with said mosquito netting.

* * * * *